(12) United States Patent (10) Patent No.: US 8,633,669 B2
Henness (45) Date of Patent: Jan. 21, 2014

(54) ELECTRICAL CIRCUIT FOR CONTROLLING ELECTRICAL POWER TO DRIVE AN INDUCTIVE LOAD

(76) Inventor: Marc Henness, Kissimmee, FL (US)

(*) Notice: Subject to any disclaimer, the term of this patent is extended or adjusted under 35 U.S.C. 154(b) by 220 days.

(21) Appl. No.: 13/335,440

(22) Filed: Dec. 22, 2011

(65) Prior Publication Data

US 2012/0161690 A1   Jun. 28, 2012

Related U.S. Application Data

(60) Provisional application No. 61/460,158, filed on Dec. 24, 2010.

(51) Int. Cl.
*H02P 23/00* (2006.01)
*H02P 25/00* (2006.01)

(52) U.S. Cl.
USPC ...... 318/795; 318/400.31; 318/800; 320/166; 320/167

(58) Field of Classification Search
USPC ............ 318/400.31, 789, 795, 786, 800, 139; 320/132, 166, 167, 118; 361/15, 16, 17
See application file for complete search history.

(56) References Cited

U.S. PATENT DOCUMENTS

| | | | |
|---|---|---|---|
| 3,247,440 A | | 4/1966 | Brower |
| 3,573,549 A | * | 4/1971 | Wolf .............................. 361/16 |
| 3,703,680 A | | 11/1972 | Frank |
| 3,973,169 A | * | 8/1976 | Titus .............................. 361/17 |
| 4,104,576 A | | 8/1978 | Frank |
| 4,219,856 A | * | 8/1980 | Danfors et al. ................. 361/15 |
| 4,295,174 A | * | 10/1981 | Peterson et al. ................. 361/16 |
| 4,365,190 A | | 12/1982 | Pasternack |
| 4,533,986 A | | 8/1985 | Jones |
| 4,571,535 A | | 2/1986 | Gyugyi |
| 4,710,735 A | * | 12/1987 | Blahous et al. ................. 333/175 |
| 4,956,739 A | * | 9/1990 | Becker et al. .................... 361/16 |
| 5,006,973 A | | 4/1991 | Turner |
| 5,087,999 A | * | 2/1992 | Sato et al. ....................... 361/17 |

(Continued)

FOREIGN PATENT DOCUMENTS

JP    2004121023    4/1992
JP    8168182    6/1996

(Continued)

OTHER PUBLICATIONS

PCT Application, International Search Report and Written Opinion, PCT/US2011/066916.

*Primary Examiner* — Paul Ip
(74) *Attorney, Agent, or Firm* — Daniel Law Offices, P.A.; Jason T. Daniel, Esq.

(57) ABSTRACT

A method and system are disclosed for controlling electrical current through an inductive load. The electrical current is supplied by one of at least three selectable dual capacitor bank electrical circuits. The method includes storing electrical energy during a charge operating state in first and second capacitor banks of a first dual capacitor bank circuit. The stored electrical energy is then used to drive the inductive load when operating the first dual capacitor bank circuit in a drive operating state. After depleting the stored electrical energy from the first and second capacitor banks, the first dual capacitor bank transitions to a collection operating state that includes collecting electrical energy from the inductive load. A second and third dual capacitor circuits simultaneously transition among the charge operating state, the drive operating state, and the collection operating state during operation.

20 Claims, 8 Drawing Sheets

(56) References Cited

U.S. PATENT DOCUMENTS

| | | | |
|---|---|---|---|
| 5,164,893 A * | 11/1992 | Luscher et al. | 363/137 |
| 5,179,289 A * | 1/1993 | Sridharan | 307/110 |
| 5,674,266 A * | 10/1997 | Stendahl | 607/63 |
| 5,715,155 A | 2/1998 | Shahani | |
| 5,744,920 A * | 4/1998 | Orton | 318/139 |
| 5,900,723 A * | 5/1999 | Rostron | 323/210 |
| 6,008,548 A * | 12/1999 | Fenner et al. | 307/105 |
| 6,215,278 B1 * | 4/2001 | Okamura et al. | 320/119 |
| 6,241,751 B1 * | 6/2001 | Morgan et al. | 607/8 |
| 6,317,343 B1 * | 11/2001 | Okamura et al. | 363/59 |
| 6,323,623 B1 * | 11/2001 | Someya et al. | 320/166 |
| 6,479,910 B1 * | 11/2002 | Vithayathil | 307/139 |
| 6,606,012 B2 * | 8/2003 | Novak | 333/17.3 |
| 6,753,623 B2 * | 6/2004 | McIntyre et al. | 307/109 |
| 6,777,912 B1 * | 8/2004 | Yamada et al. | 320/118 |
| 6,885,170 B2 * | 4/2005 | Okamura et al. | 320/166 |
| 7,239,109 B2 * | 7/2007 | Park et al. | 318/789 |
| 7,498,697 B2 * | 3/2009 | Hofmann | 307/106 |
| 7,730,981 B2 * | 6/2010 | McCabe et al. | 180/65.225 |
| 7,750,607 B2 * | 7/2010 | Nakajima et al. | 320/167 |
| 7,928,705 B2 * | 4/2011 | Hooijschuur et al. | 323/272 |
| 7,969,167 B2 * | 6/2011 | Khanna et al. | 324/686 |
| 8,085,561 B2 * | 12/2011 | Hanington | 363/61 |
| 8,203,310 B2 * | 6/2012 | McCabe | 320/132 |
| 8,207,798 B1 * | 6/2012 | Wright | 333/32 |
| 8,294,505 B2 * | 10/2012 | Chen et al. | 327/337 |
| 2002/0109415 A1 * | 8/2002 | McIntyre et al. | 307/109 |
| 2002/0180465 A1 * | 12/2002 | Novak | 324/707 |
| 2003/0128013 A1 * | 7/2003 | Okamura et al. | 320/166 |
| 2005/0212493 A1 * | 9/2005 | Yamaguchi et al. | 320/166 |
| 2006/0038528 A1 * | 2/2006 | Park et al. | 318/786 |
| 2007/0018731 A1 * | 1/2007 | Casenave et al. | 331/1 A |
| 2007/0086146 A1 * | 4/2007 | Timmerman et al. | 361/434 |
| 2007/0090808 A1 * | 4/2007 | McCabe et al. | 320/137 |
| 2007/0103228 A1 * | 5/2007 | Chen et al. | 327/565 |
| 2007/0216230 A1 * | 9/2007 | Hofmann | 307/108 |
| 2009/0010031 A1 | 1/2009 | Kuan | |
| 2010/0237835 A1 * | 9/2010 | Takeda et al. | 323/211 |
| 2012/0026757 A1 * | 2/2012 | Manabe | 363/21.12 |
| 2012/0161730 A1 * | 6/2012 | Farnsworth | 323/272 |

FOREIGN PATENT DOCUMENTS

| | | |
|---|---|---|
| JP | 9252528 | 9/1997 |
| JP | 10094182 | 4/1998 |
| JP | 10174284 | 6/1998 |
| JP | 11215695 | 8/1999 |
| JP | 2000209775 | 7/2000 |
| JP | 2000253572 | 9/2000 |
| JP | 2000324710 | 11/2000 |
| JP | 2003111286 | 4/2003 |
| JP | 2004254385 | 9/2004 |
| WO | 9514963 | 6/1995 |
| WO | 2006039478 | 4/2006 |
| WO | 2009095702 | 8/2009 |

* cited by examiner

ELECTRICAL CIRCUIT FOR CONTROLLING ELECTRICAL POWER TO DRIVE AN INDUCTIVE LOAD

CROSS REFERENCE TO RELATED APPLICATIONS

This application claims the benefit of U.S. Provisional Application No. 61/460,158 filed on Dec. 24, 2010 which is hereby incorporated herein by reference.

TECHNICAL FIELD

This disclosure relates to electrical power management, and more particularly to electrical power management of an electric motor.

BACKGROUND

The statements in this section merely provide background information related to the present disclosure and may not constitute prior art.

Electric motors generate mechanical energy through the interaction of magnetic fields and current-carrying conductors. Some electric motors may also be used to generate electric energy by applying mechanical energy to create a magnetic field and an electrical energy potential across a gradient. Electricity generating machines are generally referred to as generators, alternators or a dynamo. A common implementation of an electric motor includes using a simple inductive coil driver to apply a potential to one side of the inductive coil when the other side is electrically connected to a ground.

An ideal inductor-capacitor circuit has inductance and capacitance, but no resistance, and therefore does not dissipate or radiate energy for a loss in electrical energy efficiency. In operation, the ideal inductor-capacitor circuit could oscillate between storage as an electric field in the capacitor, and a magnetic field in the inductor. However, actual inductors have resistance (due to the resistance of the wire and losses in core material), and parasitic capacitance (due to the electric field between the turns of wire which are at slightly different potentials). The capacitance increasingly affects the inductor's behavior at increasing frequencies. At higher frequencies, resistance and resistive losses in inductors increase, and core losses also contribute to inductor losses at higher frequencies.

Therefore, it is desirable to provide an inductor capacitor driver system having low power loss to drive an inductive load such as an electric motor.

SUMMARY

A method and system are disclosed for controlling electrical current through an inductive load. The electrical current is supplied by one of at least three selectable dual capacitor bank electrical circuits. The method includes storing electrical energy in first and second capacitor banks that are electrically and selectively connected in series of a first dual capacitor bank circuit when operating the dual capacitor bank circuit in a charge operating state. The stored electrical energy is then used to drive the inductive load when operating the first dual capacitor bank circuit in a drive operating state. After depleting the stored electrical energy from the first and second capacitor banks, the first dual capacitor bank transitions to a collection operating state that includes collecting electrical energy from the inductive load with the first and second capacitor banks electrically selectively connected in parallel. A second and third dual capacitor circuits simultaneously transition among the charge operating state, the drive operating state, and the collection operating state during operation.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
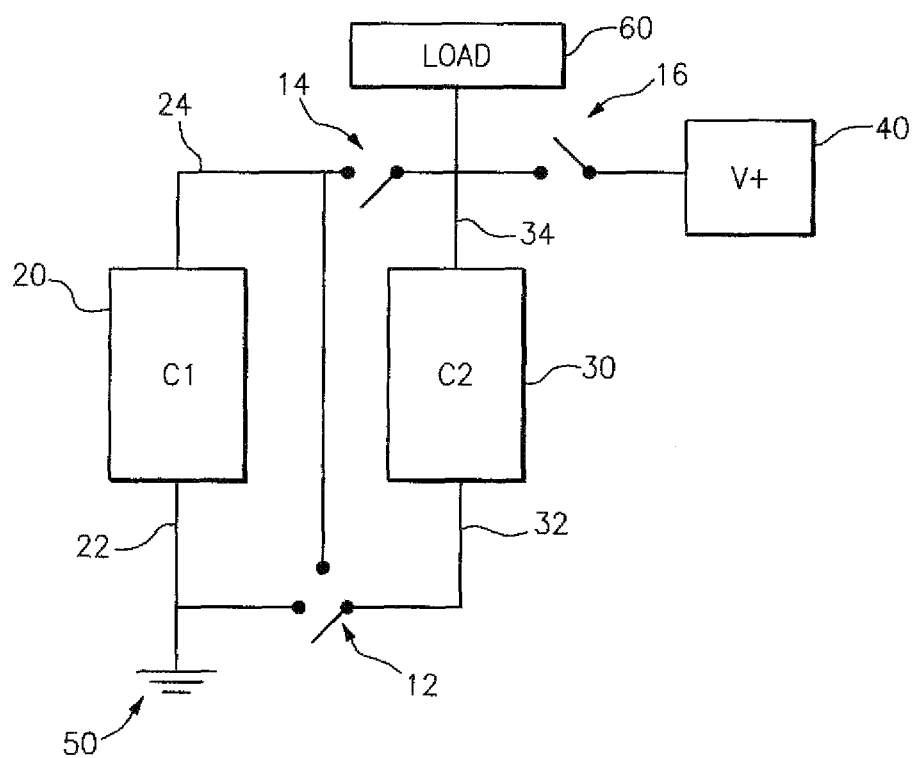
FIG. 1 schematically shows an exemplary dual bank electrical circuit, in accordance with the present disclosure.

Referring now to the drawings, wherein the depictions are for the purpose of illustrating certain exemplary embodiments only and not for the purpose of limiting the same, FIG. 1 schematically shows an exemplary dual bank electrical circuit 10 having a first bank of capacitors 20 (C1), a second bank of capacitors 30 (C2), an electrical power source 40 and a load 60. The first bank of capacitors 20 includes a first end 22 electrically connected to a ground 50 and a first electrical switch 12, and a second end 24 electrically connected to the first electrical switch 12 and a second electrical switch 14. The second bank of capacitors 30 includes a first end 32 electrically connected to the first switch and a second end 34 electrically connected to the second switch 14, a third switch 16, and the load 60.

The first and second bank of capacitors 20 and 30 may each include any number of capacitor devices electrically connected in parallel and in series.

The switches 12, 14, and 16 may be any type suitable for controlling electrical current configured to break an electrical circuit and interrupt the electrical current or divert it from one conductor to another such as solid-state relays and digital active devices such as bipolar junction transistors, and insulated gate bipolar transistors and other transistor arrangements and devices. The first switch 12 is preferably a single pole, double throw switch, while the second and third switches 14 and 16 are preferably single pole single throw switches.

The load 60 may be any electrical component such as an inductive coil or solenoid configured to utilize electrical current. In one embodiment, the load 60 is an electric motor such as an induction motor. The electric motor preferably includes stator(s), rotor(s), and/or additional components configured to convert electrical power to mechanical power.

Figure 2:
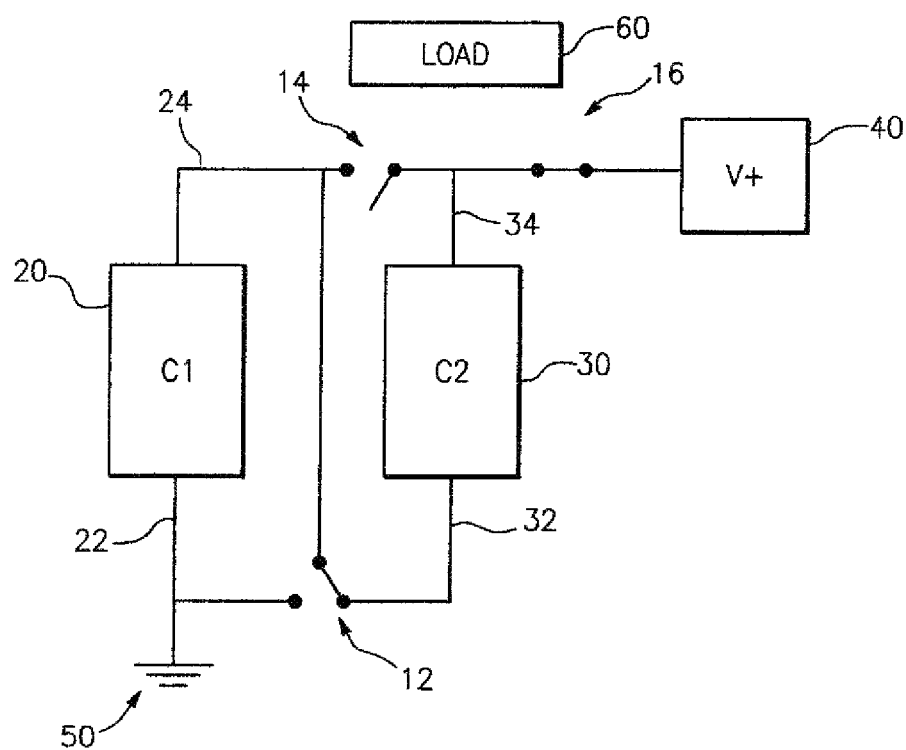
FIG. 2 schematically shows the exemplary dual bank electrical circuit in a charge operating state, in accordance with the present disclosure.

FIG. 2 schematically shows the exemplary dual bank electrical circuit in a charge operating state. The charge operating state includes charging the first and second capacitor banks 20 and 30 to store electrical energy therein. As FIG. 2 shows, the first bank of capacitors 20 is electrically connected in series with the second bank of capacitors 30. The second bank of capacitors is electrically connected to the electrical power source 40 and disconnected from the load 60. In one embodiment, the exemplary dual bank electrical circuit is transitioned to the charge operating state by switching the first switch 12 to a position electrically connecting the second end 24 of the first capacitor bank 20 to the first end 32 of the second bank of capacitors 30. The second switch 14 is in an open position. The third switch 16 is closed, electrically connecting the power source 40 to the second end 34 of the second bank of capacitors 30.

Figure 3:
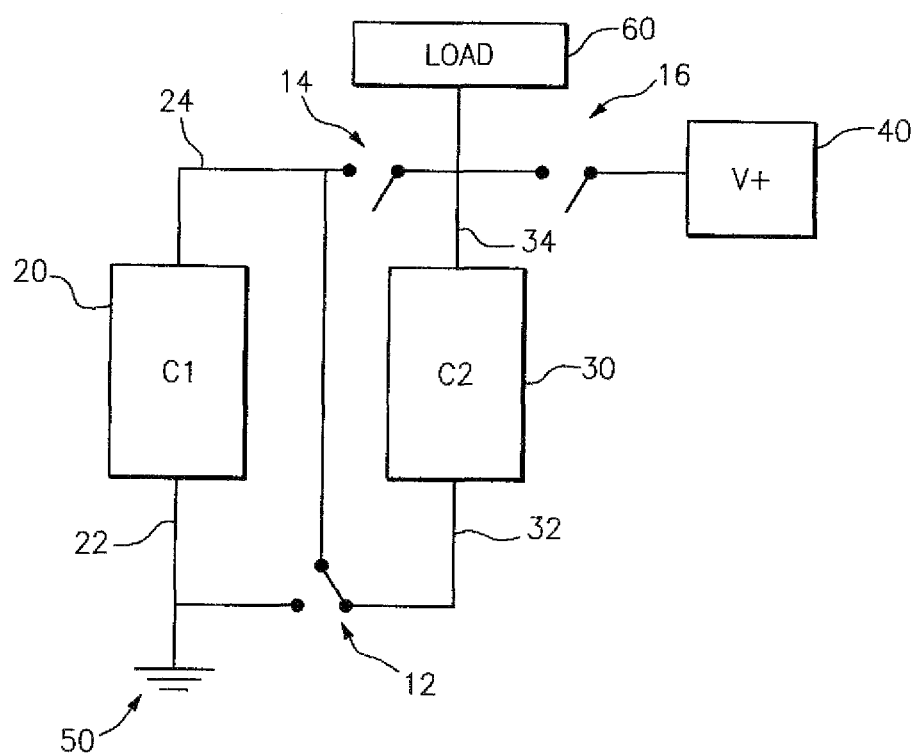
FIG. 3 schematically shows the exemplary dual bank electrical circuit in a drive operating state, in accordance with the present disclosure.

FIG. 3 schematically shows the exemplary dual bank electrical circuit in a drive operating state. The drive operating state may be utilized to provide electrical energy to the load to drive operation thereof. As FIG. 3 shows, the first bank of capacitors 20 is electrically connected in series with the second bank of capacitors 30. The second bank of capacitors is electrically connected to the load 60 and disconnected from the power source 40. In one embodiment, the exemplary dual bank electrical circuit is transitioned to the drive operating state by switching the first switch 12 to a position electrically connecting the second end 24 of the first capacitor bank 20 to the first end 32 of the second bank of capacitors 30. The second switch 14 is in an open position. The third switch 16 is open, electrically disconnecting the power source 40 to the second end 34 of the second bank of capacitors 30.

Figure 4:
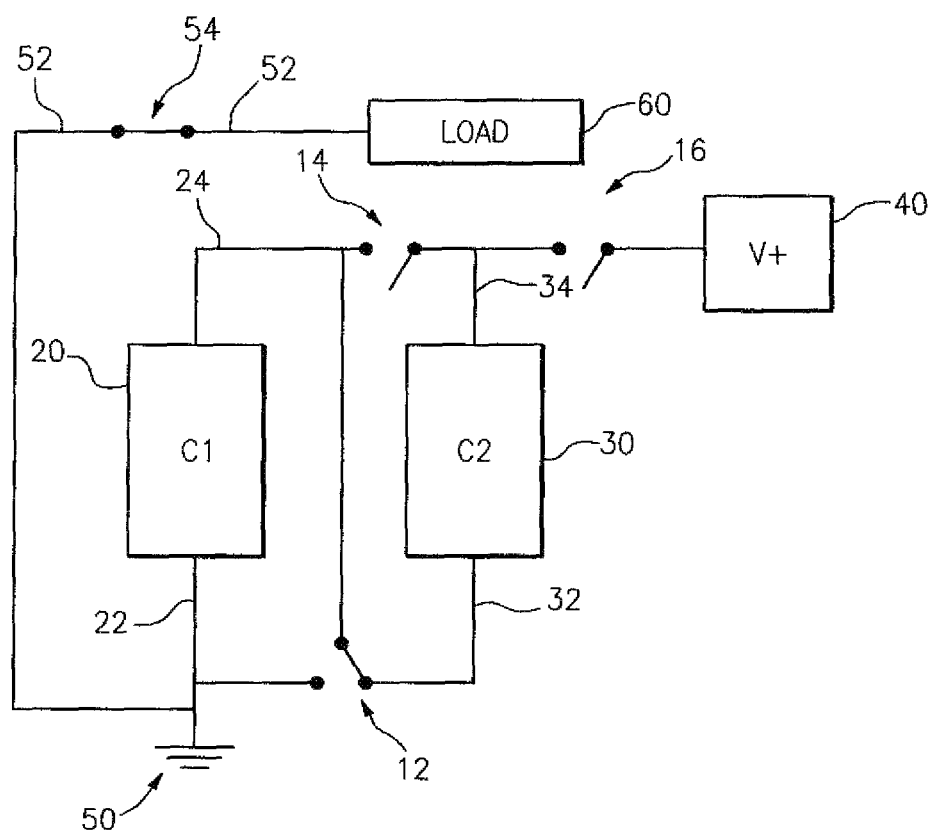
FIG. 4 schematically shows the exemplary dual bank electrical circuit in a natural response operating state, in accordance with the present disclosure.

FIG. 4 schematically shows the exemplary dual bank electrical circuit in a natural response operating state. The natural response operating state is configured to enable a load to continue conduction from ground potential. As FIG. 4 shows, the first and second banks of capacitors 20 and 30 are electrically disconnected from the load 60 and disconnected from the power source 40. The load 60 is electrically connected to the ground 50. The first and second banks of capacitors 20 and 30 may be connected in series, in parallel, or disconnected. The particular connection of the first and second banks of capacitors 20 and 30 does not affect the operating performance in the natural response operating state, and is therefore unimportant. In one embodiment, the dual bank electrical circuit includes a line 52 to ground 50 connecting a switch 54 to the load 60. The dual bank electrical circuit is transitioned to the natural response operating state by connecting the ground 50 to the load 60. The first and second switch 12 and 14 are in an open or closed position. The third switch 16 is open, electrically disconnecting the power source 40 to the second end 34 of the second bank of capacitors 30.

Figure 5:
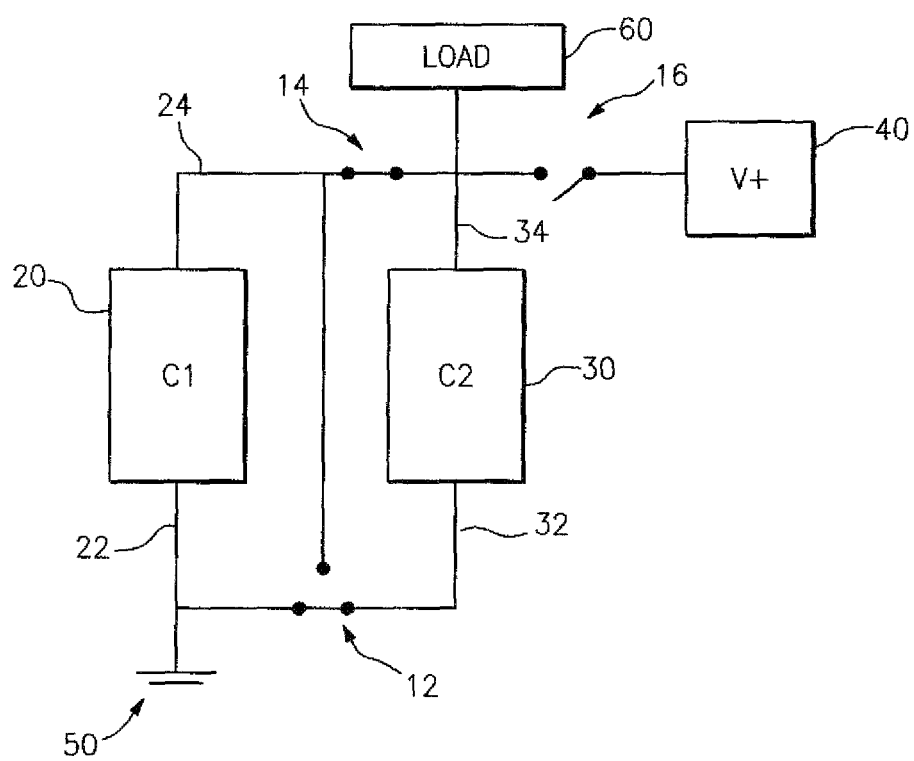
FIG. 5 schematically shows the exemplary dual bank electrical circuit in a collection operating state, in accordance with the present disclosure.

FIG. 5 schematically shows the exemplary dual bank electrical circuit in a collection operating state. The collection operating state is configured to enable electrical energy from another electrical circuit to drive a load. As FIG. 5 shows, the first bank of capacitors 20 is electrically connected in parallel with the second bank of capacitors 30. The second bank of capacitors is electrically connected to the load 60 and disconnected from the power source 40. In one embodiment, the exemplary dual bank electrical circuit is transitioned to the collection operating state by switching the first switch 12 to a position electrically connecting the first end 22 of the first capacitor bank 20 to the first end 32 of the second bank of capacitors 30. The second switch 14 is in a closed position, connecting the second end 24 of the first bank of capacitors to the second end 34 of the second bank of capacitors 30. The third switch 16 is open, electrically disconnecting the power source 40 to the second end 34 of the second bank of capacitors 30.

Figure 6A:
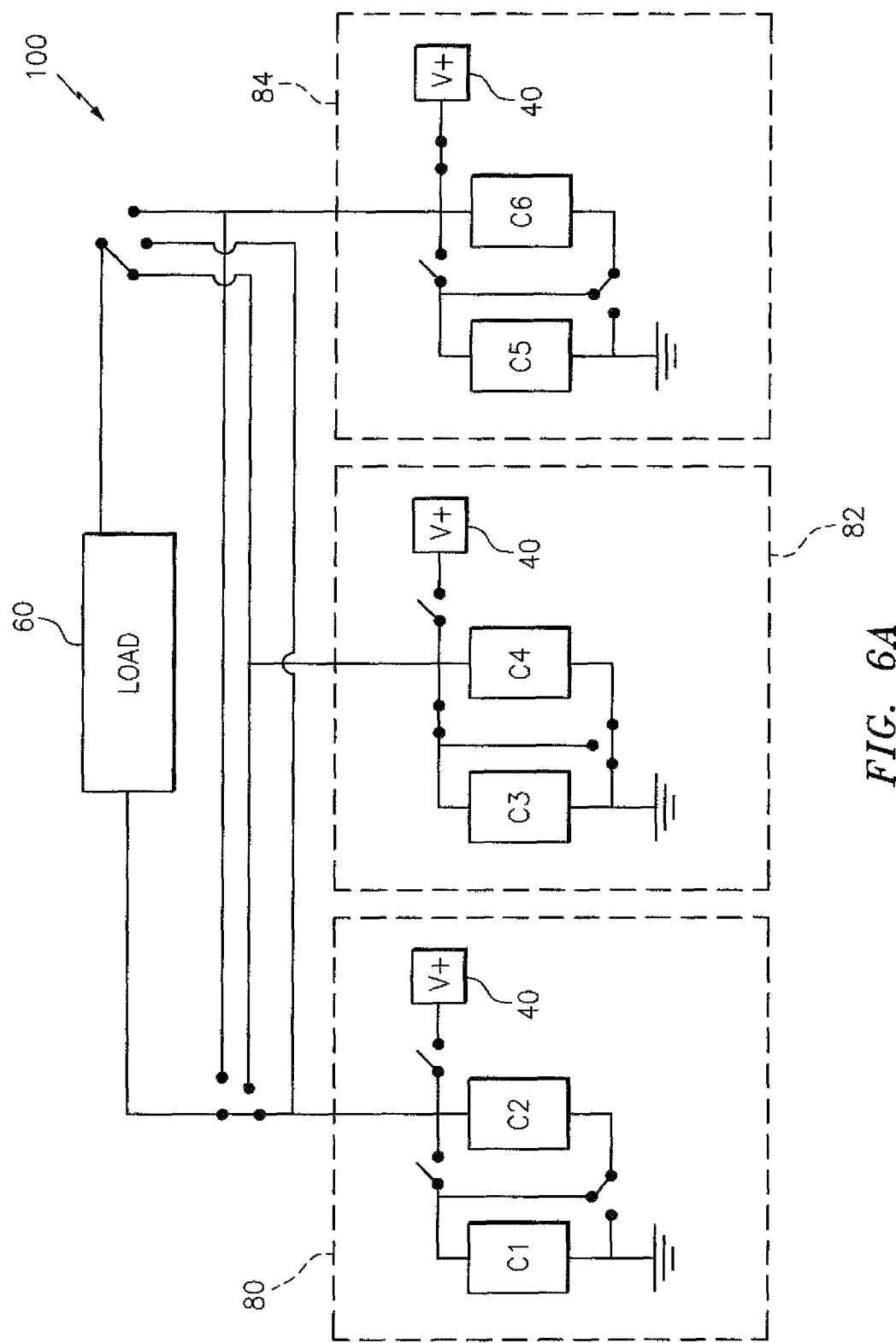
FIGS. 6A-6C schematically show an electrical circuit, including three dual bank electrical circuits, in three phases, in accordance with the present disclosure.
Figure 6B:
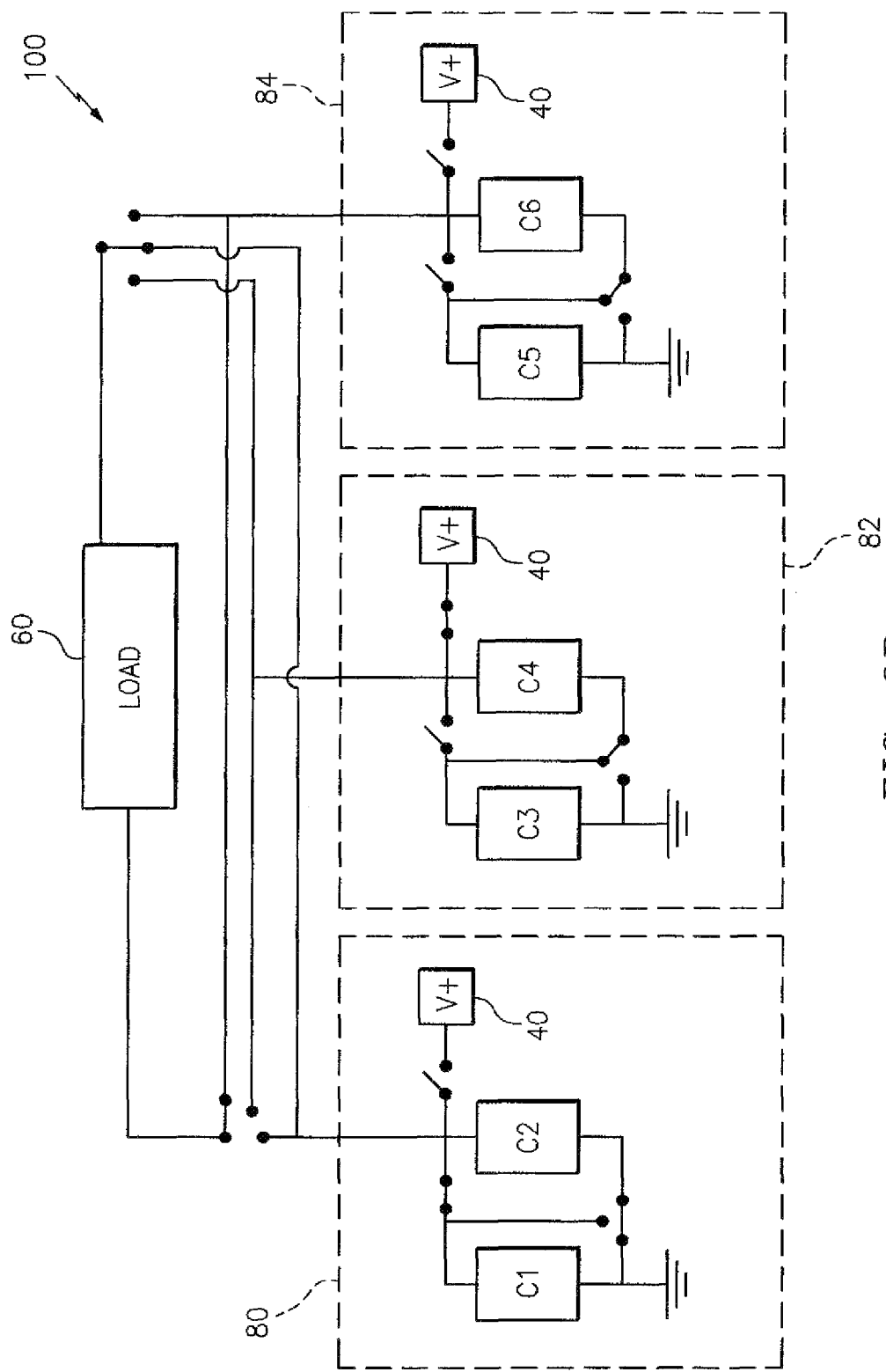
Figure 6C:
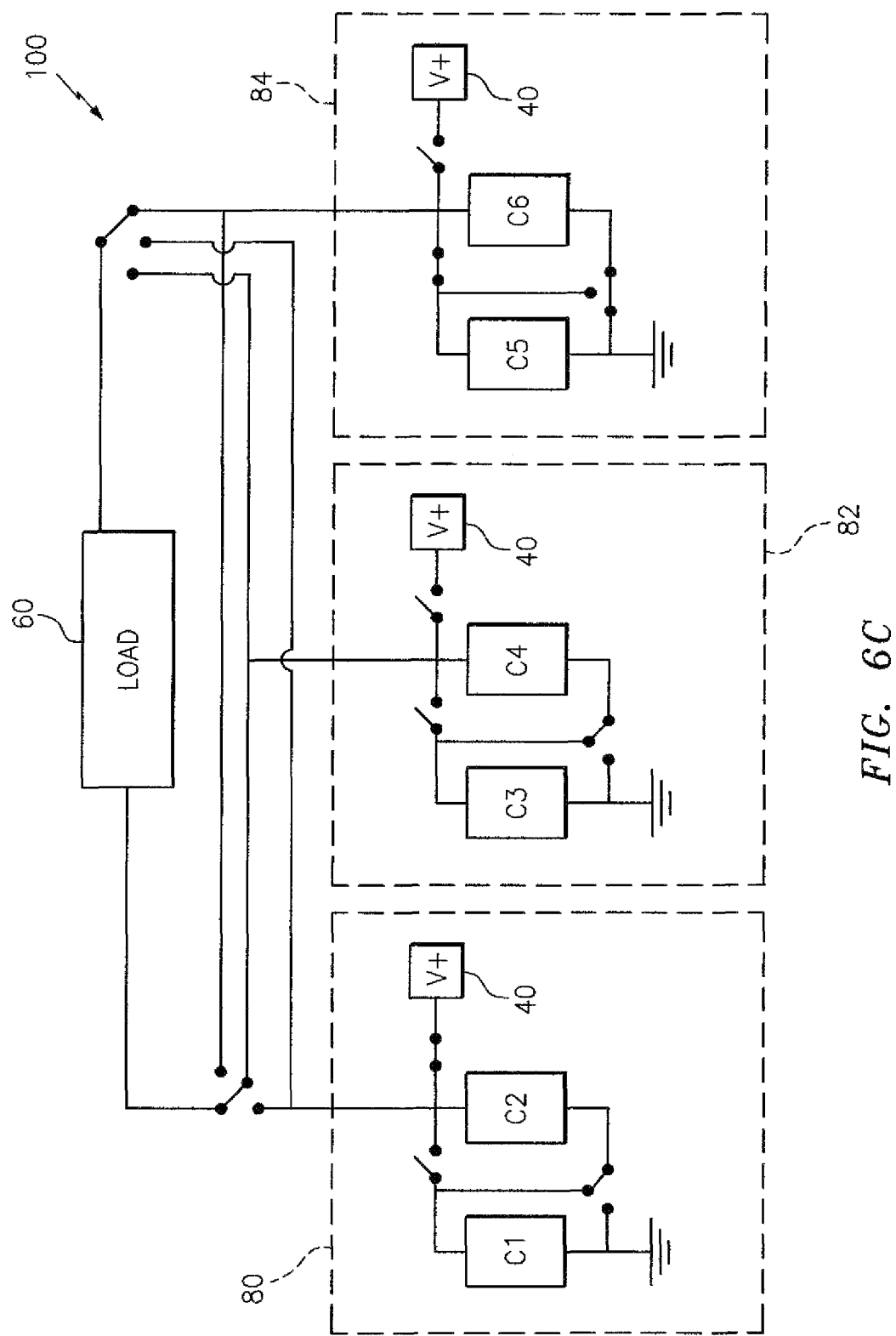

FIGS. 6A-6C schematically show an electrical circuit 100 including three dual bank electrical circuits in three phases. Each dual bank electrical circuit is configured to transition among the charge operating state, the drive operating state, the natural response operating state, and the collection operating state. To drive the load, the electrical circuit charges and discharges electrical energy stored and collected in the capacitor banks of the dual bank electrical circuits. Each dual bank electrical circuit transitions from the charge operating state to the drive operating state, from the drive operating state to the natural response operating state, from the natural response operating state to the collection operating state, and from the collection operating state to the charge operating state during operation of the electrical circuit. As one skilled in the art will recognize, the particular electrical connection means used to electrically connect the dual electrical circuits to the load may be implemented using one of many types of electrical switches and electrical switching circuits and arrangements and is therefore not intended to be limited thereby.

FIG. 6A schematically shows the electrical circuit in a first phase. A first dual bank electrical circuit 80 in a drive operating state is electrically connected to a first end of the load 60, while a second dual bank electrical circuit 82 in a collection operating state is electrically connected to a second end of the load 60. A third dual bank electrical circuit 84 is in a charge operating state and is electrically connected to the power source 40. Subsequent to either the first dual bank electrical circuit 80 discharging stored electrical energy or the third dual bank electrical circuit 84 charging electrical energy to a predetermined amount, the electrical circuit transitions from a first phase to a second phase. The electrical energy levels within the dual banks may be modeled or estimated based upon time lapsed within any one of the operating states. For example, a dual bank electrical circuit may be presumed to be charge after connected to the power source after a predefined time period. Lapse of the predefined time period may then be used to transition the electrical circuit phases.

FIG. 6B schematically shows the electrical circuit 100 in the second phase. As FIG. 6B shows, the first dual bank electrical circuit 80 transitioned from the drive operating state to the collection operating state, the second dual bank electrical circuit 82 transitioned from the collection operating state to the charge operating state, and the third dual bank electrical circuit 84 transitioned from the charge operating state to the drive operating state. The third dual electrical circuit 84 is electrically connected to the first end of the load 60. The first dual electrical circuit 80 is electrically connected to the second end of the load 60. The second dual electrical circuit 82 is electrically connected to the power source 40. Subsequent to either the third dual bank electrical circuit 84 discharging stored electrical energy or the second dual electrical circuit 82 charging electrical energy to a predetermined amount, the electrical circuit transitions from the second phase to a third phase.

FIG. 6C schematically shows the electrical circuit in the third phase. As FIG. 6C shows, the first dual bank electrical circuit 80 transitioned from the collection operating state to the charge operating state, the second dual bank electrical circuit 82 transitions from the charge operating state to the drive operating state, and the third dual bank electrical circuit 84 transitioned from the drive operating state to the collection operating state. The first dual electrical circuit 80 is electrically connected to the power source 40. The second dual electrical circuit 82 is electrically connected to the first end of the load 60. The third dual electrical circuit 84 is electrically connected to the second end of the load 60. Subsequent to the third operating phase, the electrical circuit 100 may repeat the cycle by transitioning to the first phase.

In operation, the electrical current though the load 60 will fluctuate based on the rate of the capacitor bank switching relative to the angular frequency of the electrical circuit. For increased efficiency, it is preferential to drive the load 60 using an impulse from a dual bank electrical circuit in a drive operating state, then switch the dual bank electrical circuit from the drive operating state to the natural response operating state to allow the load 60 to continue conduction from ground. Pulsing the dual bank electrical circuit in the drive operating state in this way will produce an electrical charge transfer into the dual bank electrical circuit in the collection operating state of a multiple of the electrical charge depletion from the dual bank electrical circuit in the drive operating state. This is important for power recovery since the differential of electrical power to charge for the dual bank electrical circuit in the collection operating state will be less than the differential of electrical power to charge of the dual bank electrical circuit in the drive operating state. In one embodiment, switching between the drive operating state and the natural response operating state would be executed at about a 50% duty cycle. Fluctuations around an average current through the load could be controlled by the frequency of the switching, with the electric circuit 100 having a minimum frequency of an angular frequency divided by 2pi. Initially, when ramping up the average load current, the impulse drive duty cycle needs to be increased, so the load current does not reduce completely during the natural response phases. In one embodiment, an alternating current source may be created by alternating the end of the load 60 which is electrically connected to the dual bank electrical circuit in the drive operating state.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An electrical circuit comprising:
   a first dual bank electrical circuit having a grounded first bank of capacitors selectively electrically connected in series and selectively electrically connected in parallel with a second bank of capacitors, the first and second bank of capacitors selectively electrically connected in series to a load and to a power source, and selectively electrically connected in parallel when collecting electrical energy;
   a second dual bank electrical circuit having a grounded third bank of capacitors selectively electrically connected in series and selectively electrically connected in parallel with a fourth bank of capacitors, the third and fourth bank of capacitors selectively electrically connected in series to the load and to the power source, and selectively electrically connected in parallel when collecting electrical energy; and
   a third dual bank electrical circuit having a grounded fifth bank of capacitors selectively electrically connected in series and selectively electrically connected in parallel with a sixth bank of capacitors, the fifth and sixth bank of capacitors selectively electrically connected in series to the load and to the power source, and selectively electrically connected in parallel when collecting electrical energy.

2. The electrical circuit of claim 1, wherein the load comprises a first end configured to selectively electrically connect to one of the first, second, and third dual bank electrical circuits, and further comprises a second end configured to selectively electrically connect to one of the first, second, and third dual bank electrical circuits.

3. The electrical circuit of claim 2, wherein the first dual bank electrical circuit is electrically connected to the first end of the load and the second dual bank electrical circuit is electrically connected to the second end of the load subsequent to the first dual electrical circuit transitioning to a charged operating state.

4. The electrical circuit of claim 1, wherein the first, second, and third dual bank electrical circuits are configured to transition among a plurality of operating states comprising a drive operating state, a charge operating state, and a collection operating state.

5. The electrical circuit of claim 4, wherein the first, second, and third dual bank electrical circuits are configured to transition among the plurality of operating states based upon electrical power stored within constituent capacitor banks.

6. The electrical circuit of claim 4, wherein each of the first, second, and third dual bank electrical circuits is configured to consecutively transition from the charge operating state to the drive operating state, from the drive operating state to the collection operating state, and from the collection operating state to the charge operating state.

7. The electrical circuit of claim 4, wherein the plurality of operating states further comprises a natural response operating state.

8. The electrical circuit of claim 7, wherein each of the first, second, and third dual bank electrical circuits is configured to consecutively transition from the charge operating state to the drive operating state, from the drive operating state to the natural response operating state, from the natural response operating state to the collection operating state, and from the collection operating state to the charge operating state.

9. The electrical circuit of claim 1, wherein the load is an induction motor.

10. The electrical circuit of claim 1, wherein the load comprises a solenoid.

11. The electrical circuit of claim 1, wherein the electrical power source comprises a current source.

12. The electrical circuit of claim 1, wherein the first and second bank of capacitors are selectively connected in series when the first electrical switch is in a closed position, and selectively connected in parallel when the first and second electrical switches are in a closed position.

13. The electrical circuit of claim 1, wherein the third and fourth bank of capacitors are selectively connected in series when the fourth electrical switch is in a closed position, and selectively connected in parallel when the fourth and fifth electrical switches are in a closed position.

14. The electrical circuit of claim 1, wherein the fifth and sixth bank of capacitors are selectively connected in series when the seventh electrical switch is in a closed position, and selectively connected in parallel when the seventh and eighth electrical switches are in a closed position.

15. The electrical circuit of claim 1, wherein the load is an induction motor.

16. An electrical circuit comprising:
   a first dual bank electrical circuit comprising:
      a first bank of capacitors, having a first end electrically connected to a ground and a second end connected to a first and second electrical switch, and
      a second bank of capacitors having a first end electrically connected to the first electrical switch and a second end electrically connected to the second electrical switch and a third electrical switch;
   a second dual bank electrical circuit comprising:
      a third bank of capacitors, having a first end electrically connected to a ground and a second end connected to a fourth and fifth electrical switch, and
      a fourth bank of capacitors having a first end electrically connected to the fourth electrical switch and a second end electrically connected to the fifth electrical switch and a sixth electrical switch; and
   a third dual bank electrical circuit comprising:
      a fifth bank of capacitors, having a first end electrically connected to the ground and a second end connected to a seventh and eighth electrical switch, and
      a sixth bank of capacitors having a first end electrically connected to the seventh electrical switch and a second end electrically connected to the eighth electrical switch and a ninth electrical switch;
   an electrical power source selectively electrically connected to the first, second, and third dual bank electrical circuits; and
   wherein the first, second, and third dual bank electrical circuits are each selectively electrically connected to a load via one or more electrical switches.

17. A method for controlling electrical current through an inductive load, said current supplied by one of at least three selectable dual capacitor bank electrical circuits, the method comprising:
   storing electrical energy in first and second capacitor banks electrically selectively connected in series of a first dual capacitor bank circuit when operating the dual capacitor bank circuit in a charge operating state;
   driving the inductive load with the stored electrical energy in the first and second capacitor banks selectively connected in series when operating the first dual capacitor bank circuit in a drive operating state;
   collecting electrical energy from the inductive load with the first and second capacitor banks electrically selectively connected in parallel when operating the first dual capacitor bank circuit in a collection operating state; and
   simultaneously transitioning the first dual capacitor bank circuit, a second dual capacitor bank circuit and a third dual capacitor bank circuit among the charge operating state, the drive operating state, and the collection operating state.

18. The method of claim 17, further comprising:
   transitioning one of the first, second, and third dual capacitor bank circuits from the drive operating state to a natural response operating state before transitioning to the collection operating state.

19. The method of claim 17, wherein a total electrical current communicating through the inductive load during the charge and drive operating states is integrated into a collection capacitor bank of the dual capacitor bank operating in the collection operating state.

20. The method of claim 17, further comprising:
   maintaining electrical current through the inductive load by switching between the drive operating state and the natural response operating state at a frequency greater than the circuit's angular frequency divided by 2pi.

* * * * *